(12) United States Patent
Periyakulam Tharakraj et al.

(10) Patent No.: US 11,523,049 B1
(45) Date of Patent: Dec. 6, 2022

(54) PRIVACY SHUTTERS POSITIONS DETECTIONS

(71) Applicant: Hewlett-Packard Development Company, L.P., Spring, TX (US)

(72) Inventors: Karthick Periyakulam Tharakraj, Spring, TX (US); Milind Thakre, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/355,370

(22) Filed: Jun. 23, 2021

(51) Int. Cl.
*H04N 5/232* (2006.01)
*H04N 5/225* (2006.01)
*G03B 9/08* (2021.01)
*H04N 7/15* (2006.01)
*G06V 20/40* (2022.01)
*G06V 40/16* (2022.01)

(52) U.S. Cl.
CPC .......... *H04N 5/23219* (2013.01); *G03B 9/08* (2013.01); *G06V 20/40* (2022.01); *G06V 40/172* (2022.01); *H04N 5/2254* (2013.01); *H04N 7/15* (2013.01)

(58) Field of Classification Search
CPC ................................................. H04N 5/23219
USPC ..................................................... 348/207.99
See application file for complete search history.

(56) References Cited

U.S. PATENT DOCUMENTS

| 9,465,276 B2 | 10/2016 | Jonsson | |
|---|---|---|---|
| 2002/0196348 A1* | 12/2002 | Kubo | H04N 5/772 386/E5.072 |
| 2019/0272005 A1 | 9/2019 | Wickett | |
| 2019/0391729 A1 | 12/2019 | Josephson | |
| 2020/0020493 A1* | 1/2020 | Weaver | G06F 1/1626 |
| 2020/0028994 A1 | 1/2020 | Rami | |
| 2020/0033697 A1 | 1/2020 | Rami | |

\* cited by examiner

*Primary Examiner* — Joel W Fosselman
(74) *Attorney, Agent, or Firm* — Tong, Rea, Bentley & Kim LLC (57) ABSTRACT

An example computing device is provided. The computing device includes a video camera, a privacy shutter, and a processor communicatively coupled to the video camera. The video camera is to capture an image of a user. The privacy shutter is movably coupled to the video camera to move between an open position and a closed position. The processor is to activate the video camera when a video conference call application is executed, detect that the privacy shutter is in the closed position when the video camera is activated, and replace a blank screen caused by the privacy shutter in the closed position with a background image in response to detection of the privacy shutter in the closed position.

12 Claims, 6 Drawing Sheets

FIG. 6

PRIVACY SHUTTERS POSITIONS DETECTIONS

BACKGROUND

As more workers work from home, video conferencing has become a popular choice for communicating or holding meetings. Applications can be executed on computing devices to host video conferences or virtual meetings that allow users to communicate with one another and that may include audio and video.

A computing device may include a video camera that can capture an image of the user that is shared with video images of other users on the displays of the computing devices participating in a video conference or virtual meeting. Some computing devices may include a shutter on the video camera. The shutter may be used to cover the video camera when the video camera is deactivated for privacy.

DETAILED DESCRIPTION

Examples described herein provide a computing device to detect a closed privacy shutter when a video camera of the computing device is active. As discussed above, applications can be executed on computing devices to host video conferences or virtual meetings that allow users to communicate with one another and that may include audio and video. A computing device may include a video camera that can capture an image of the user that is shared with video images of other users on the displays of the computing devices participating in a video conference or virtual meeting. Some computing devices may include a shutter on the video camera. The shutter may can be used to cover the video camera when the video camera is deactivated for privacy.

Recently, the use of virtual backgrounds has become popular with the use of the video conference calls. A virtual background can be an image selected by a user to hide the user's surroundings and only show the user in the displays of other participants. However, when virtual backgrounds are used, it can be difficult to tell when the privacy shutter on a camera is left in a closed position. For example, before virtual backgrounds were used, a black screen would be shown on the user's display device.

The present disclosure provides a computing device that can detect when a privacy shutter is in a closed position when a video camera of the computing device is activated. When the video camera is activated and the privacy shutter is detected to be in a closed position, then a notification may be generated and transmitted to the display device of the computing device to notify the user. The user may then open the privacy shutter or indicate that the user is intentionally taking a break from the video conference call.

If the user provides an indication of an intentional break from the video conference call, a custom image or video may be displayed to other users on the video conference call. The custom image or video may also include a message to notify the other participants that the user has stepped away from his or her camera.

In an example, a sensor may automatically detect the presence of a user in front of the video camera. When the presence of the user is detected and the privacy shutter is detected to be closed, a notification may be sent to the user to open the privacy shutter.

In an example, a facial identification of the user may be performed before the custom image is replaced with a live video image of the user for the video conference call. This may prevent an unauthorized user from appearing in the video conference call (e.g., the user's child may sit down in front of the camera while the user has stepped away). As a result, the computing device of the present disclosure may detect when a privacy shutter on a video camera is closed and may provide options for the user when the user chooses to keep the privacy shutter closed during a video conference call.

Figure 1:
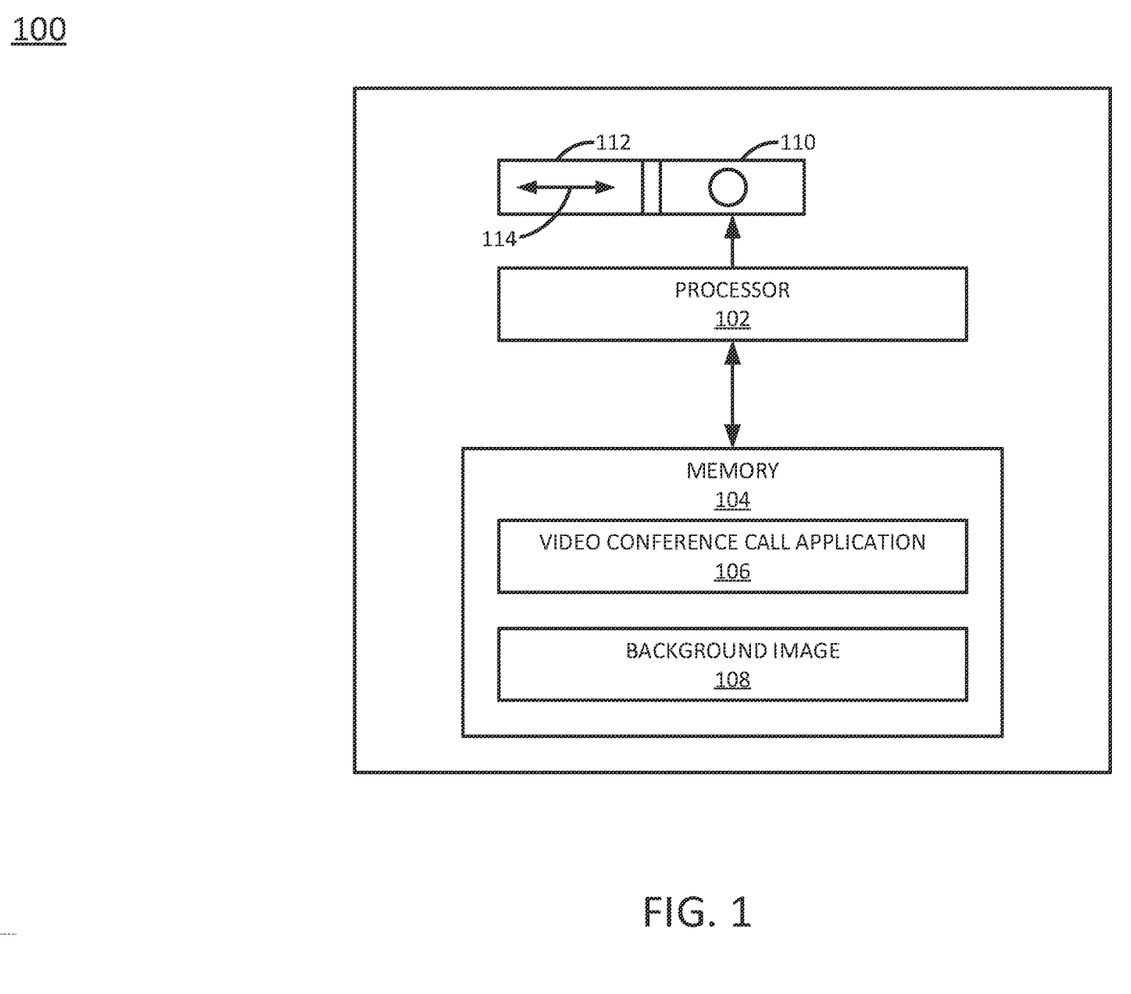
FIG. 1 is a block diagram of an example computing device of the present disclosure to detect a closed privacy shutter and replace a blank screen caused by the closed privacy shutter with a background image.

FIG. 1 illustrates an example of a computing device 100 to detect a closed privacy shutter and replace a blank screen caused by the closed privacy shutter with a background image of the present disclosure. In an example, the computing device 100 may include a processor 102, a memory 104, a video camera 110, and a privacy shutter 112. It should be noted that the computing device 100 has been simplified for ease of explanation and may include additional components that are not shown. For example, the computing device 100 may include a display device, input devices (e.g., a mouse, a trackpad, a keyboard, and the like), a graphics processor, external device interfaces (e.g., a universal serial bus (USB) interface), a wired or wireless communication interface (e.g., an Ethernet card, a WiFi network card, and the like), a microphone, and the like.

In an example, the processor 102 may be communicatively coupled to the video camera 110 and the memory 104. The processor 102 may execute instructions stored in the memory 104 to perform the functions described herein. In an example, the processor 102 may control operation of the video camera 110 and collect video images captured by the video camera 110.

The video camera 110 may be any type of video capturing device. For example, the video camera 110 may be a red, green, blue (RGB) video camera that can capture the video. The video may include a plurality of video frames. Each video frame may comprise a plurality of pixels. The number of pixels per video frame may be a function of a resolution capability of the video camera 110. The pixels can be analyzed to determine the presence of a user in the video images, as discussed in further details below.

In an example, the privacy shutter 112 may be used to cover the video camera 110 when the video camera 110 is not in use. For example, the privacy shutter 112 may be movably coupled to the video camera 110 to allow the privacy shutter 112 to slide to the left and right, as shown by an arrow 114. A closed position of the privacy shutter 112 may be when the privacy shutter 112 is moved to cover the video camera 110. An open position of the privacy shutter 112 may be when the privacy shutter 112 is moved away from the video camera 110.

In an example, the memory 104 may be a non-transitory computer readable storage medium. For example, the memory 104 may be hard disk drive, a solid state drive, a random access memory (RAM), a read-only memory (ROM), and the like.

The memory 104 may store a video conference call application 106 and a background image 108. The memory 104 may also store instructions executed by a processor to detect that the privacy shutter 112 is in a closed position when the video camera 110 is activated and to replace a blank screen caused by the closed privacy shutter 112 with the background image 108.

In an example, the video conference call application 106 may execute a video conference call. The video conference call may include a plurality of different participants that join the call via respective copies of the video conference call application 106 executing on their respective endpoint or computing devices.

When the video conference call application 106 is executed, the video camera 110 may be activated. However, if the privacy shutter 112 is in a closed position, the screen shown to the other participants may be blank or black. The participant may not know that the privacy shutter is closed.

In addition, the video conference call application 106 may allow a participant to use a virtual background. Thus, if the virtual background is activated, it may be even more difficult to recognize that the privacy shutter 112 is in a closed position.

The present disclosure allows the computing device 100 to detect when the privacy shutter 112 is in a closed position when the video camera 110 is active. The processor 102 may then replace the blank screen or the virtual background image with the background image 108. The background image 108 may be selected by the participant to remind the participant that the privacy shutter 112 is in the closed position when the video conference call application 106 is executing and the video camera 110 is activated.

In an example, the background image 108 may include a message to notify the participant to move the privacy shutter 112 to the open position. In another example, the background image 108 may include a message that can be seen by other participants on the video conference call. For example, the message may indicate that the privacy shutter 112 of a participant is closed. The message may indicate that the participant has intentionally closed the privacy shutter 112 to take a break from video.

Figure 3:
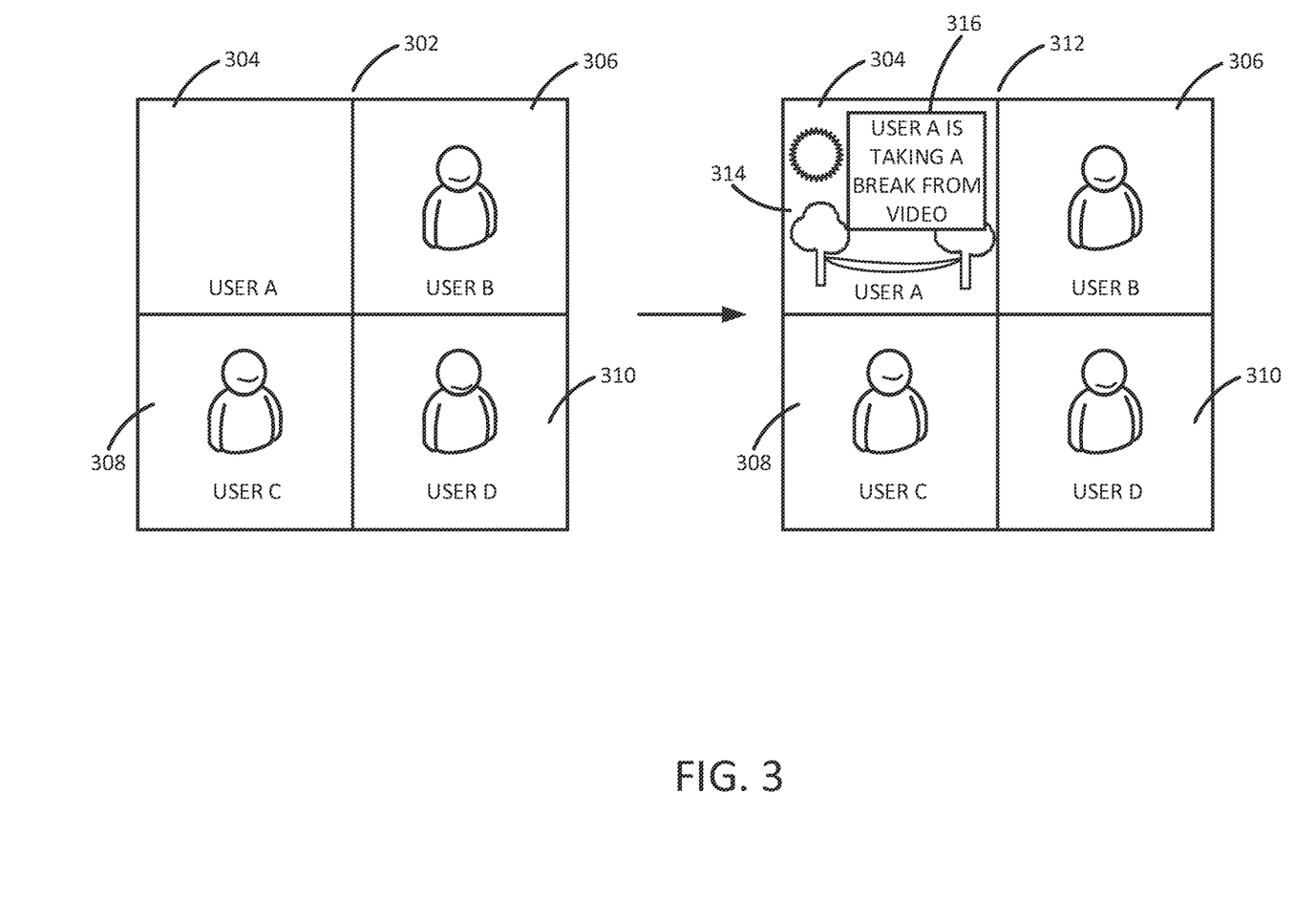
FIG. 3 is a block diagram of an example custom image of the present disclosure that is shown on a participants screen when a privacy shutter is closed.

FIG. 3 illustrates example screen shots of the video conference call application 106 of the present disclosure. Screenshot 302 illustrates an example of a video call with four different users. User A may be a participant who is using the computing device 100 of the present disclosure. User A may be shown in a window 304. User B, User C, and User D may be participants on the video conference call using their own respective computing devices. As shown in the screenshot 302, User A's privacy shutter 112 may be in the closed position. As a result, the image of User A is not shown to the other users. Rather, the window 304 of User A shows a blank screen or a black image.

As discussed above, the processor 102 may detect that the privacy shutter 112 is closed and replace the blank screen with the background image 108. The screenshot 312 illustrates the window 304 of User A that displays a background image 314 of a beach scene when the privacy shutter 112 is in the closed position.

As noted above, in some instances, User A may intentionally close the privacy shutter 112 during the video conference call. User A may want to take a break from the video, but still hear the audio exchanged during the video conference call. The background image 314 may include a message or notification 316 that User B, User C, and User D may see. The notification 316 may indicate that User A has is taking a break from video, or is outside of a field of view of the video camera 110, and let the other users know that User A has intentionally closed the privacy shutter 112.

In other examples, the notification 316 may also be seen by User A on the display device connected to the computing device 100. The notification 316 may indicate that the privacy shutter 112 is closed. Thus, User A may move the privacy shutter 112 to the open position such that video images of User A may be captured and shown to the other users on the video conference call.

The computing device 100 may include additional components to improve the detection of the position of the privacy shutter 112. In addition, security measures may be added to prevent unauthorized users from opening the privacy shutter 112 and showing their images to the other users on the video conference call.

Figure 2:
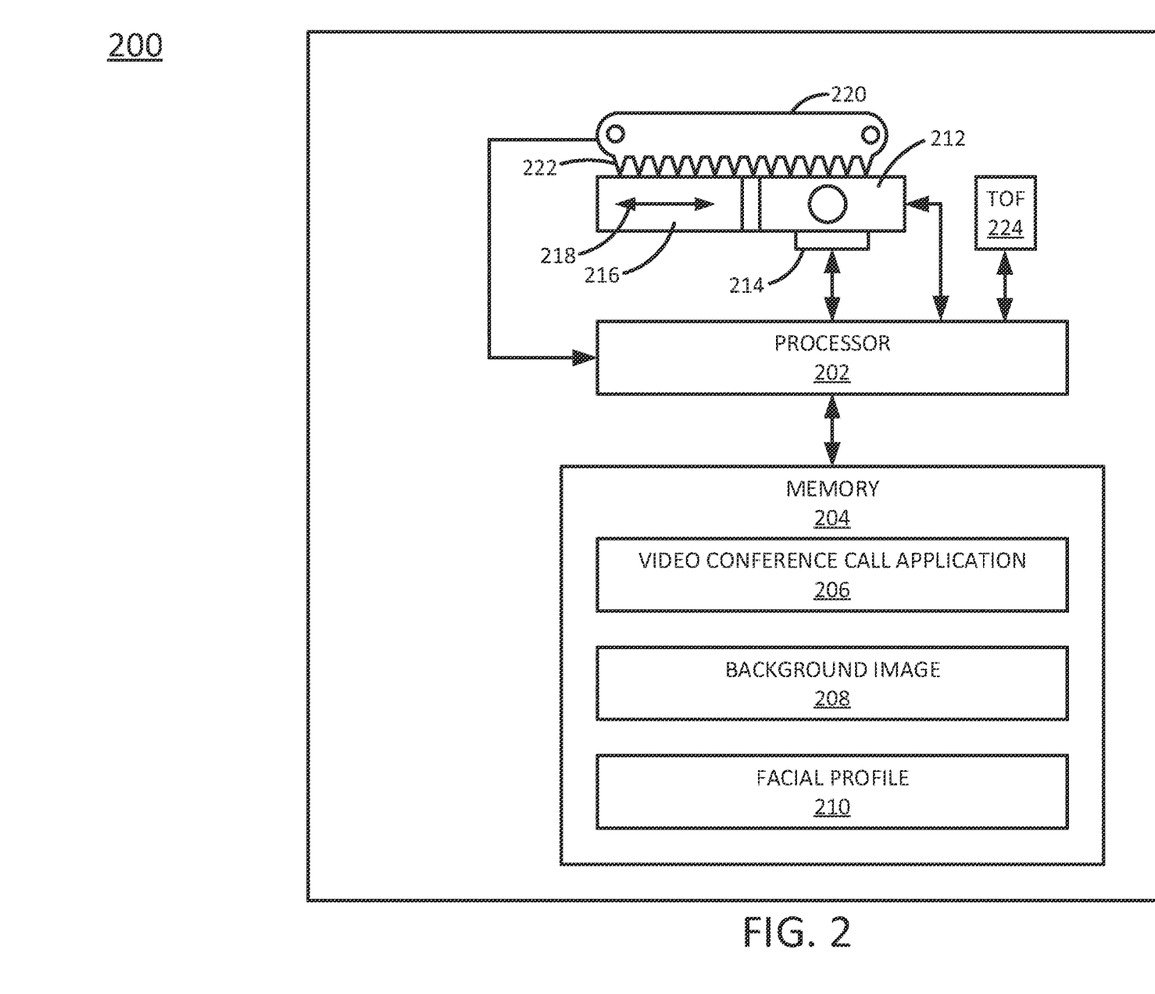
FIG. 2 is a block diagram of an example computing device of the present disclosure that can perform facial recognition before adding a video image of a user to a video conference call after a privacy shutter is opened.

FIG. 2 illustrates another computing device 200 that can perform these functions. For example, the computing device 200 illustrated in FIG. 2 can use sensors to detect the position of the privacy shutter, use video analysis to detect the position of the privacy shutter, perform facial recognition before adding a video image of a user to a video conference call after a privacy shutter is opened, and the like.

In an example, the computing device 200 may be similar to the computing device 100. For example, the computing device 200 may include a processor 202, a memory 204, a video camera 212, and a privacy shutter 216. The processor 202, the memory 204, the video camera 212, and the privacy shutter 216 may be similar to the processor 102, the memory 104, the video camera 110, and the privacy shutter 112 illustrated in FIG. 1, and described above.

In an example, the memory 204 may store a video conference call application 206 similar to the video conference call application 106. The memory 204 may also store a background image 208 similar to the background image 108. The memory 204 may also store a facial profile 210 of an authorized user of the computing device 200. The facial profile 210 can be used to prevent unauthorized users from sending video images of themselves to the video conference call, as described in further details below.

In an example, the computing device 200 may also include a sensor 214, a sensor 224, and an electro-mechanical device 220 to allow the processor 202 to automatically move the privacy shutter 216. In an example, the sensor 214 may be any type of sensor that can detect the presence of the privacy shutter 216. The sensor 214 may be a resistive sensor, a capacitive sensor, an electrical sensor, and the like.

In an example, the privacy shutter 216 may be moved from side-to-side between an open position and a closed position, as shown by an arrow 218. The sensor 214 may detect a presence of the privacy shutter 216 when the privacy shutter 216 is moved over the sensor 214 into the closed position. The sensor 214 may send a signal to processor 202 to indicate that the privacy shutter 216 is in the closed position.

In another example, the processor 202 may analyze the video images received from the video camera 212. As discussed above, the video images may be captured as a series of video frames that include a plurality of pixels. The processor 202 may analyze the color values of the pixels. If the pixels all have a black color value, then the processor 202 may determine that the privacy shutter 216 is in the closed position and covering the video camera 212.

In an example, if the video conference call application 206 is executed and the video camera 212 is activated, the processor 202 may replace the blank screen with the background image 208, as described above and illustrated in FIG. 3. In some instances, the processor 202 may generate a notification that is shown on a display device connected to the computing device 200. The notification may remind a user that the privacy shutter 216 is in the closed position.

In an example, the user may want to move the privacy shutter 216 into an open position. For example, the processor 202 may receive a confirmation to open the privacy shutter in response to the notification indicating that the privacy shutter 216 is closed. The notification may include an option to open the privacy shutter.

In response to the confirmation, the processor 202 may move the privacy shutter 216 automatically into the open position by controlling the electro-mechanical device 220. In an example, the electro-mechanical device 220 may be an electrically controlled mechanism that can use electronic controls to generate a mechanical movement. For example, the electro-mechanical device 220 may use electrical signals from the processor 202 to mechanically move the privacy shutter 216. In an example, the electro-mechanical device 220 may include belt 222 with treads that fit against treads on the privacy shutter 216. A motor may be controlled by the processor 202 via electronic signals to rotate the belt 222 counter-clockwise or clockwise to slide the privacy shutter 216 between the closed position and the open position. It should be noted that the motor and belt 222 is one example. Other types of electro-mechanical devices 220 may be used to automatically move the privacy shutter 216.

In an example, the computing device 200 may include the sensor 224, as noted above. The sensor 224 may be used to detect the presence of a person in front of the video camera 212. In an example, the sensor 224 may be a time of flight (TOF) sensor.

When the user returns to sit in front of the video camera 212, the sensor 224 may detect the presence of the user and send a signal to the processor 202. The processor 202 may then automatically move the privacy shutter 216 to the open position or detect that the privacy shutter 216 has been manually moved to the open position. The processor 202 may then activate the camera 212 to capture images of the user. The background image 208 may then be replaced with video images of the user.

In an example, the processor 202 may perform a facial recognition process to ensure that the user detected by the sensor 224 is an authorized participant for the video conference call. For example, the authorized participant may leave for a moment, and a child of the authorized participant may sit down in front of the video camera 212. Without the facial recognition process, the video images of the child may be transmitted to the video conference call, which may be embarrassing for the authorized participant.

In an example, after a user is detected by the sensor 224, the processor 202 may activate the video camera 212 after the privacy shutter 216 has been moved to the open position. The processor 202 may begin capturing images of the user in front of the video camera 212, but continue to play the background image 208 until the facial recognition process is completed. In other words, the video images captured by the video camera 212 may not be immediately shown on the video conference call. Rather, display of the video images captured by the video camera 212 may be delayed.

In an example, the facial recognition may be performed on the pixels of each video frame of the video image to detect a user in the video images. For example, any type of video image process may be used to detect the pixels in a video frame that are associated with a face of a user. The pixels in the video frame that comprise the image of the facial image of the user may then be compared to the facial profile 210. If the facial image of the user matches the facial profile 210, the user may be determined to be an authorized participant on the video conference call. The processor 202 may replace the background image 208 with the video images of the identified authorized participant.

If the facial image of the user does not match the facial profile 210, then the processor 202 may deactivate the video camera 212 to stop capturing video images of the user. A notification may be displayed locally on the computing device 200 to indicate that the user is not authorized to join the video conference call. The other users on the video conference call may not be aware that the facial recognition process is being performed since the background image 208 is not replaced until the user is authorized by the facial recognition process.

Thus, the computing devices 100 and 200 of the present disclosure may help users to detect when a privacy shutter is in a closed position when a video camera is activated for a video conference call application. In addition, the computing devices 100 and 200 may replace a blank screen with a background image selected by a user until the privacy shutter is opened.

Figure 4:
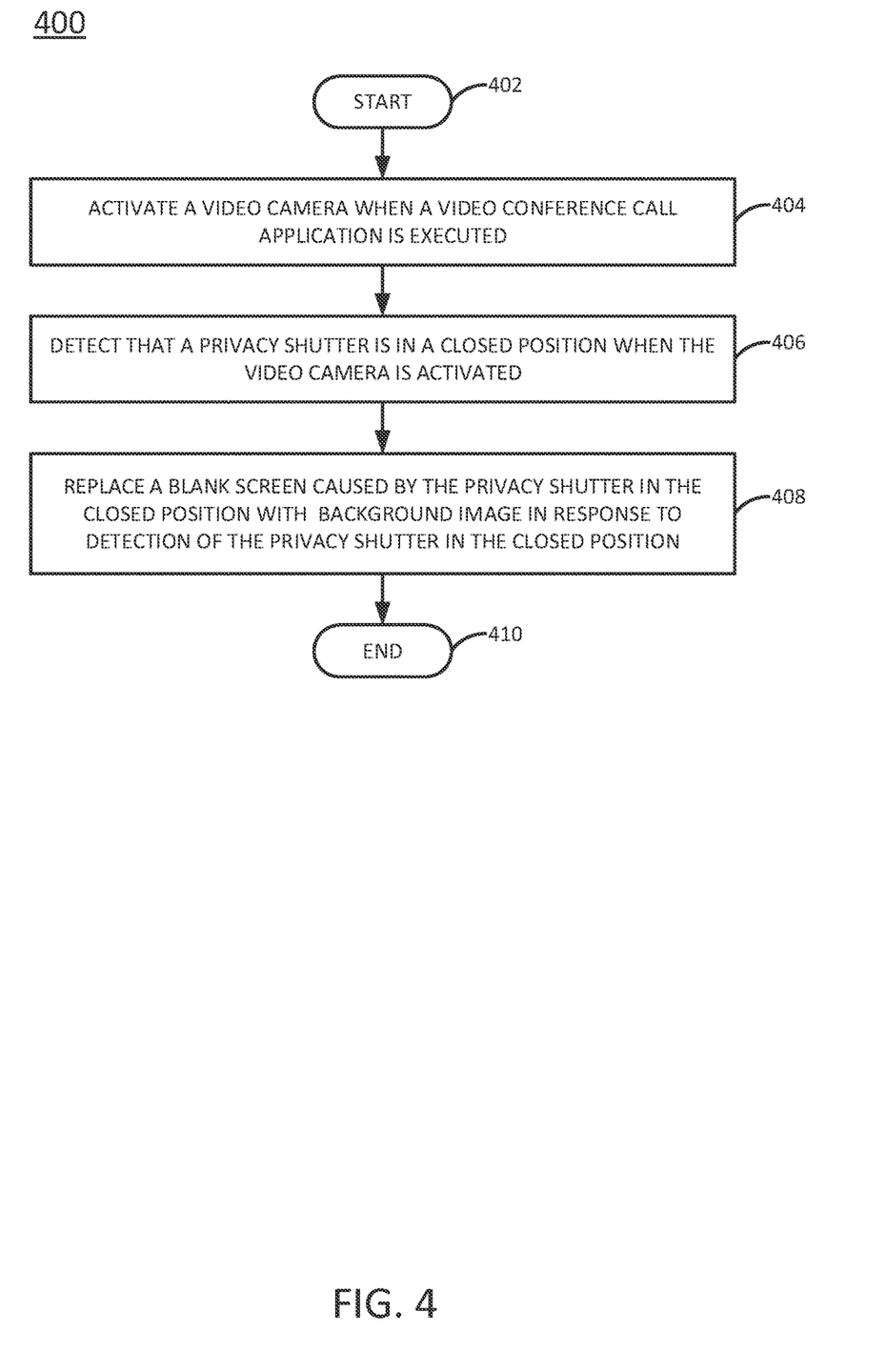
FIG. 4 is a flow chart of an example method for replacing a blank screen caused by a closed privacy shutter during a video conference call with a background image of the present disclosure.

FIG. 4 illustrates a flow diagram of an example method 400 for replacing a blank screen caused by a closed privacy shutter during a video conference call with a background image of the present disclosure. In an example, the method 400 may be performed by the computing device 100, the computing device 200, the apparatus 500 illustrated in FIG. 5 and described below, or the apparatus 600 illustrated in FIG. 6 and described below.

At block 402, the method 400 begins. At block 404, the method 400 activates a video camera when a video conference call application is executed. For example, the video conference call application may show video images of each participant on the respective display devices of the participants. The video conference call application may allow participants to communicate with one another using video and audio.

At block 406, the method 400 detects that a privacy shutter is in a closed position when the video camera is activated. In an example, the closed position of the privacy shutter may be detected using a sensor. The sensor may be positioned along a path of the privacy shutter and may detect the presence or absence of the privacy shutter. In an example, the sensor may be positioned to detect the privacy shutter in the closed position. When the senor detects the presence of the privacy shutter, the sensor may send a signal indicating that the privacy shutter is in the closed position.

In another example, the method 400 may analyze video images captured by the video camera to detect that the privacy shutter is in the closed position. For example, if all of the pixels on each video frame of the video images are black or have an identical color value, then it may be determined that the privacy shutter is in the closed position.

At block 408, the method 400 replaces a blank screen caused by the privacy shutter in the closed position with a background image in response to detection of the privacy shutter in the closed position. The background image may be a custom image or any type of video image that is selected by a user. The background image may be different from a virtual background that can be used with the video conference call application to allow the user to recognize that the privacy shutter is in the closed position.

In an example, the background image may also include a notification. For example, if the user intentionally keeps the privacy shutter in the closed position, the notification may notify other participants on the video conference call that the user is taking a temporary break from video.

In an example, when the user returns to sit in front of the camera, the privacy shutter can be opened (manually or automatically, as described above) and the video images of the user can replace the background image. In an example, a facial recognition process may be performed to ensure that the user is an authorized participant for the video conference call. At block 410, the method 400 ends.

Figure 5:
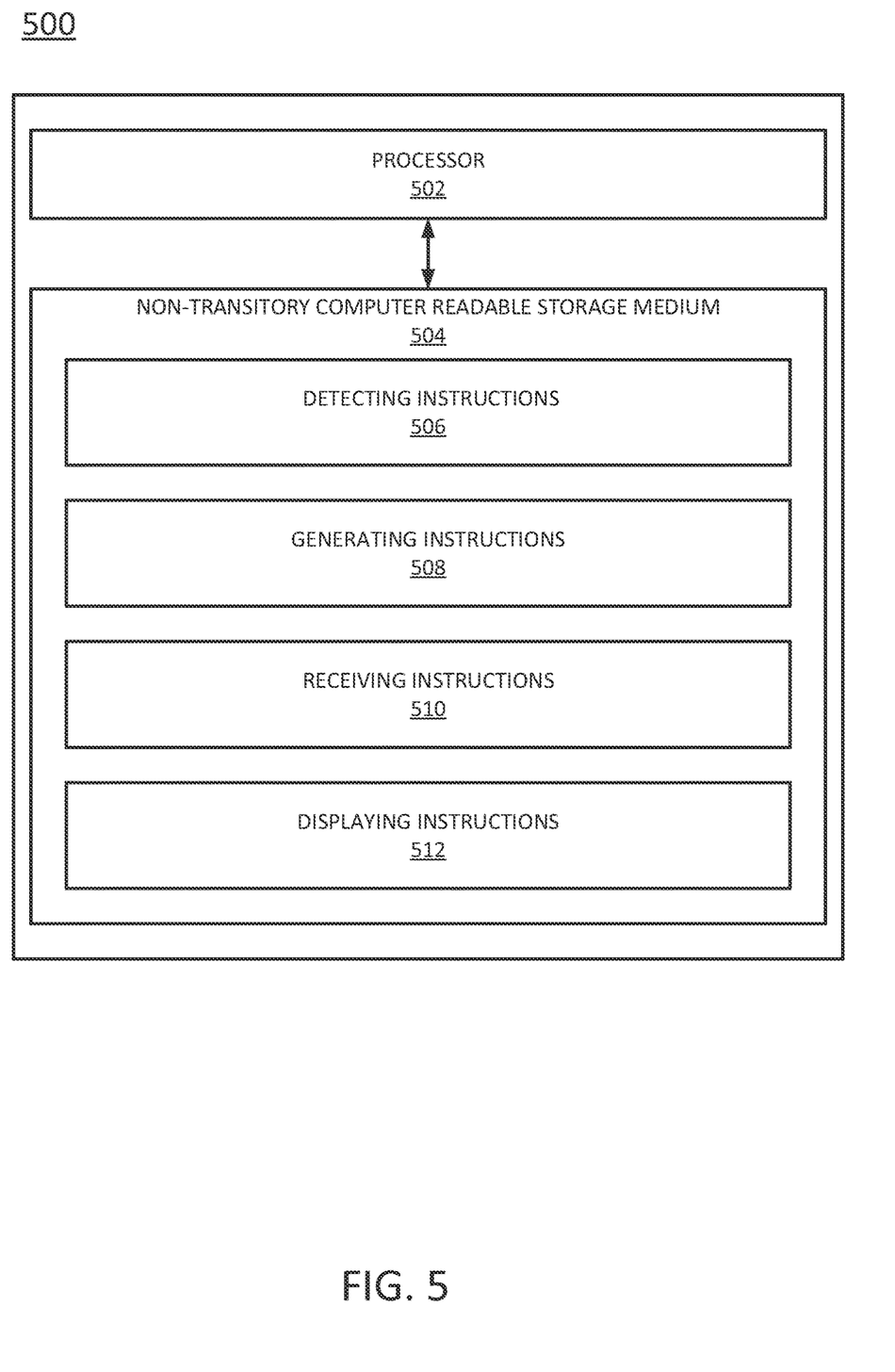
FIG. 5 is an example non-transitory computer readable storage medium storing instructions executed by a processor to execute a method for playing a background image in response to detection of a privacy shutter in a closed position during a video conference call of the present disclosure.

FIG. 5 illustrates an example of an apparatus 500. In an example, the apparatus 500 may be the computing device 100. In an example, the apparatus 500 may include a processor 502 and a non-transitory computer readable storage medium 504. The non-transitory computer readable storage medium 504 may include instructions 506, 508, 510, and 512 that, when executed by the processor 502, cause the processor 502 to perform various functions.

In an example, the instructions 506 may include detecting instructions 506. For example, the instructions 506 may detect that a privacy shutter of the computing device is in a closed position while a video conference call application is executed.

The instructions 508 may include generating instructions. For example, the instructions 508 may generate a notification to be displayed to a user to indicate that the privacy shutter is the closed position.

The instructions 510 may include receiving instructions. For example, the instructions 510 may receive confirmation from the user to keep the privacy shutter in the closed position. For example, the user may want to take a break from video temporarily while the video conference call application is being executed.

The instructions 512 may include displaying instructions. For example, the instructions 512 may display a background image that includes a message to other participants on a video conference call of the video conference call application indicating that the user is outside a field of view of the video camera of the computing device. For example, the user may intentionally move away from the field of view of the video camera and may want the privacy shutter to be closed. When the user returns, the user can open the privacy shutter to capture video images of the user and replace the background image with the video images of the user.

Figure 6:
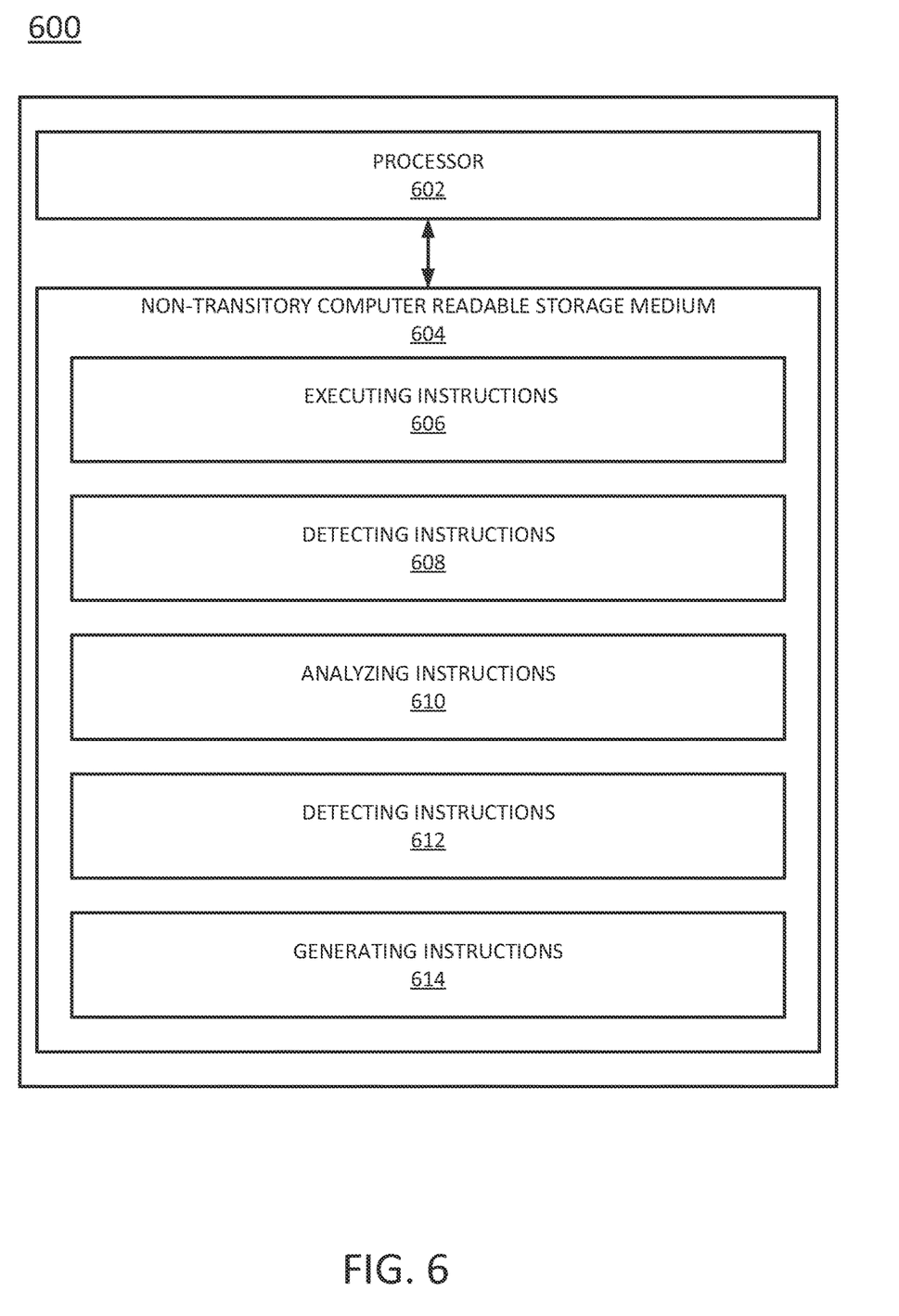
FIG. 6 is an example non-transitory computer readable storage medium storing instructions executed by a processor to execute a method for generating a notification that a privacy shutter is in a closed position during a video conference call application of the present disclosure.

FIG. 6 illustrates an example of an apparatus 600. In an example, the apparatus 600 may be the computing devices 100 or 200. In an example, the apparatus 600 may include a processor 602 and a non-transitory computer readable storage medium 604. The non-transitory computer readable storage medium 604 may include instructions 606, 608, 610, 612, and 614 that, when executed by the processor 602, cause the processor 602 to perform various functions.

In an example, the instructions 606 may include executing instructions 606. For example, the instructions 606 may execute a video conference call application.

The instructions 608 may include detecting instructions. For example, the instructions 608 may detect a presence of a user in front of a video camera. For example, a time of flight sensor may be used to detect the presence of the user.

The instructions 610 may include analyzing instructions. For example, the instructions 610 may analyze video images received from the video camera to determine that an image of the user is not detected in the video images. For example, the video frames of the video image may be analyzed to detect that all the pixels have a black color. In other words, the image of the user cannot be detected in the video frames of the video image.

The instructions 612 may include detecting instructions. For example, the instructions 612 may detect that a privacy shutter of the video camera is in a closed position based on the video images that are analyzed.

The instructions 614 may include generating instructions. For example, the instructions 614 may generate a notification to the user to indicate that the privacy shutter is in the closed position, while a background image is shown to other participants of the video conference call application. In an example, the user may open the privacy shutter or the privacy shutter may be automatically opened to begin recording video images of the user. A facial recognition process may be performed on the video images before the video images of the user are used to replace the background image. The facial recognition process may be performed on the pixels of each video frame of the video image to detect the user in the video image. The facial image of the user may then be compared to a facial profile that is stored. If the facial image matches the facial profile, the user may be an authorized participant, and the background image may be replaced with video images of the user in the video conference call application.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A computing device, comprising:
   a video camera to capture an image of a user;
   a privacy shutter movably coupled to the video camera to move between an open position and a closed position; and
   a processor communicatively coupled to the video camera to:
   activate the video camera when a video conference call application is executed;
   detect that the privacy shutter is in the closed position when the video camera is activated, wherein detection that the privacy shutter is in the closed position is based on an analysis of a video image captured by the video camera; and
   replace a blank screen caused by the privacy shutter in the closed position with a background image in response to detection of the privacy shutter in the closed position.

2. The computing device of claim 1, further comprising:
   a sensor to detect a position of the privacy shutter.

3. The computing device of claim 1, further comprising:
a time of flight sensor to detect a presence of the user in front of the video camera.

4. The computing device of claim 1, further comprising:
an electrically controlled mechanism coupled to the privacy shutter to move the privacy shutter into the open position when a confirmation is received to open the privacy shutter.

5. A non-transitory computer readable storage medium encoded with instructions which, when executed, cause a processor of a computing device to:
detect that a privacy shutter of the computing device is in a closed position while a video conference call application is executed;
generate a notification to be displayed to a user to indicate that the privacy shutter is the closed position;
receive confirmation from the user to keep the privacy shutter in the closed position;
display a background image that includes a message to other participants on a video conference call of the video conference call application indicating that the user is outside a field of view of a video camera of the computing device;
detect a presence of the user;
generate the notification to be displayed to a user to indicate that the privacy shutter is in the closed position;
detect that the privacy shutter is moved to an open position; and
perform a facial recognition of the user before inserting a video image of the user captured by the video camera into the video conference call.

6. The non-transitory computer readable storage medium of claim 5, further comprising instructions that cause the processor to:
replace the background image with the video image of the user when the user is authorized by the facial recognition that is performed.

7. The non-transitory computer readable storage medium of claim 5, further comprising instructions that cause the processor to:
stop capturing the video image of the user; and
generate a notification to be displayed to the user that the user is not authorized to join the video conference call.

8. The non-transitory computer readable storage medium of claim 5, wherein the background image is selected by the user to be automatically displayed when the privacy shutter is in the closed position and the video camera is active.

9. A non-transitory computer readable storage medium encoded with instructions which, when executed, cause a processor of a computing device to:
execute a video conference call application;
detect a presence of a user in front of a video camera;
analyze video images received from the video camera to determine that an image of the user is not detected in the video images;
detect that a privacy shutter of the video camera is in a closed position based on the video images that are analyzed; and
generate a notification to the user to indicate that the privacy shutter is in the closed position, while a background image is shown to other participants of the video conference call application.

10. The non-transitory computer readable storage medium of claim 9, wherein facial recognition is performed on the pixels of each video frame of the video images to detect the user in the video images.

11. The non-transitory computer readable storage medium of claim 9, wherein the presence of the user is detected via a time of flight sensor communicatively coupled to the computing device.

12. The non-transitory computer readable storage medium of claim 9, further comprising instructions that cause the processor to:
detect that the privacy shutter of the video camera is moved to an open position; and
replace the background image with video images of the user in the video conference call application.

* * * * *